May 3, 1960

L. J. NOVAK ET AL 2,934,820

METAL-TO-METAL ADHESIVE BONDING

Filed April 15, 1954

INVENTOR.
LEO J. NOVAK
JACK J. BULLOFF
BY Toulmin & Toulmin
ATTORNEYS

United States Patent Office 2,934,820
Patented May 3, 1960

2,934,820

METAL-TO-METAL ADHESIVE BONDING

Leo J. Novak and Jack J. Bulloff, Dayton, Ohio, assignors, by mesne assignments, to Union Carbide Corporation, New York, N.Y., a corporation of New York Application April 15, 1954, Serial No. 423,455

2 Claims. (Cl. 29—488)

This invention relates to the bonding of structural metals, and relates particularly to bondings for structural metals which are subject to high temperature and/or low pressure conditions in the course of their usage.

The invention particularly contemplates the provision of novel bonding means between metal parts which bonding agent or means adheres tenaciously to the metallic components and expands and contracts therewith to substantially the same degree.

The invention further contemplates a bonding between metal parts in which the bonding agent is flush with the external surface of the metals bonded and has no protuberant parts whatsoever.

The invention also contemplates the provision of a novel process for the bonding of metals which process is fast and relatively inexpensive.

The invention further contemplates the provision of novel apparatus for the attainment of bonds constituted primarily of metal between metallic bodies.

In the practice of the invention the metallic bodies which are to be bonded together are placed in the relationship which they will assume in the final product with the spacing intervening between at least some of the portions of the metal bodies. The bodies are then heated in the area adjacent the spacing at least, and a heat decomposable metal bearing gas is directed into the space under such conditions that decomposition of the compound occurs to effect a metal deposit on each of the bodies and plating is continued to fill the spacing and form a composite structure.

The nature of the bodies to be joined, the geometry thereof, the use and conditions to which the bond will be subjected are all factors governing the selection of the bond material and the composition from which it is derived. However, in the description of this invention primary consideration will be directed to the attainment of bonds between metals for usage in circumstances where the temperature is high and pressure differentials across the bond and the metal bodies also is of significance.

The bonding agent has a distinct advantage over other bonding materials for structural members, in, for example, aircraft, for after the bonding is effected the bonding agent may, if necessary, be smoothed off to correspond exactly to the outer contour of the parts which it bonds. Further the agent may itself serve to receive mechanical fittings or to provide air holes for ventilation, or to achieve any desired characteristics customarily exhibited by metals.

The invention will be more fully understood by reference to the following detailed description and accompanying drawings wherein.

Figure 1:
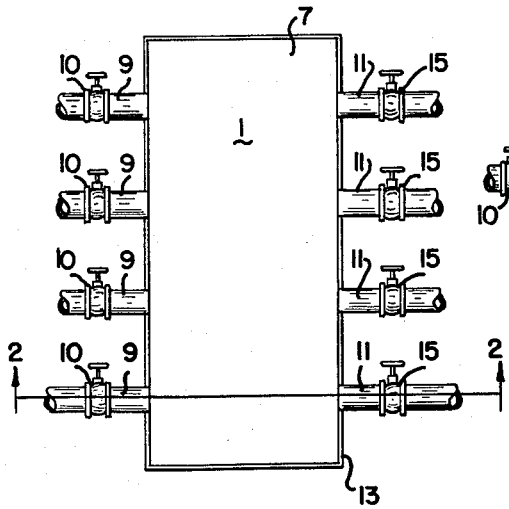
Figure 1 is a plan view illustrating metal parts secured together for bonding in accordance with the precepts of this invention.
Figure 2:
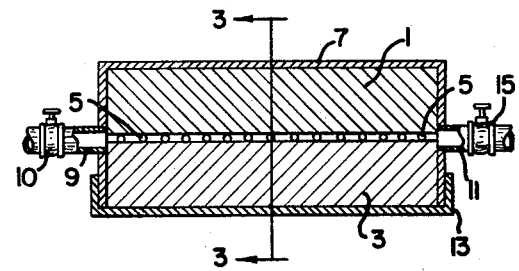
Figure 2 is a sectional view on line 2—2 of Figure 1.
Figure 3:
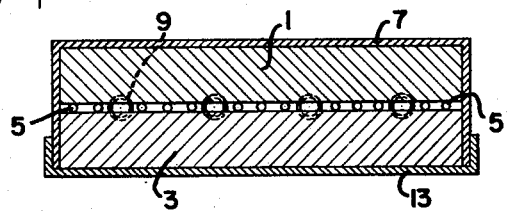
Figure 3 is a sectional view on line 3—3 of Figure 2.

Referring to the drawings there is shown in Figures 1–3, inclusive, a pair of metal bodies in the form of titanium plates indicated at 1 and 3, respectively; the plates positioned in adjacent vertical relationship with small metallic particles 5 preferably in the form of spheres and of spongy iron therebetween. Thus the bodies and spheres are so positioned as to define an intervening spacing between the metal bodies or plates.

Secured over the bodies 1 and 3 is a sheet metal structure 7 which extends across the top of body 1 and down the sides of the bodies to the base edge of body 3. This metal closure member fits the bodies snugly and is provided at 9 with inlet conduits and at 11 with outlet conduits; extending upwardly from the base over the edges of the closure member 7 is a cap 13 also of sheet metal which snugly fits over the closure member and engages against the base of the body 3.

To deposit metal in the intervening spacing around the iron spheres 5 the assembly described is placed in an oven with the conduits 9, 11 extending outwardly of the oven and with the valves 15 of conduits 11 closed. The sheet metal housing substantially closes the spacing between the metal bodies and the oven heats the bodies and housing up to the decomposition temperature of a thermally decomposable metal bearing gas, such as nickel carbonyl; the decomposition temperature range for this gas is preferably between 350° F. and 400° F. and the assembly temperature should be in this range. The bodies themselves expand in the heat more than the thin housing and a very tight seal is insured between the same during plating.

The spacing is then evacuated through conduits 9 and valves 10 by pumps (not shown) and upon attainment of substantially complete evacuation nickel carbonyl is led into the spacing through conduits 11 and valves 15, the valves 10 being open and the conduits 9 connected to a vacuum-producing source.

As the gaseous carbonyl contacts the hot metal it decomposes depositing nickel in the spacing around the solid material and on the adjacent surfaces of the metal bodies to bond the assembly together. The pumps are meanwhile operated to withdraw carbon monoxide and other gases of decomposition from the spacing as the gases form.

When the spacing between the bodies has been filled the assembly is permitted to cool in the oven, is thereafter withdrawn therefrom, and the housing removed from the metal bodies and the bonding agent. It will be found that substantially none of the nickel creeps in between the sheet metal housing and the metal bodies and that the bonding agent will have only slightly roughened edges adjacent the conduits 9, 11 and these edges may be readily smoothed off to provide a surface flush with the metal bodies.

The nickel bonding agent will have substantially all of the properties of pure nickel and may be provided with machine fittings if desired for securing the bonded assembly to other structural parts. The temperature resistance of the nickel is high for it melts at about 2600° F. Further the shear strength of the bond is good and the bond itself, due to the nature of the deposition process, has a degree of flexibility.

The bodies 1, 3 for the above described purposes may consist of molybdenum, titanium, tellurium, steel, cooper, nickel alloys, stainless steel, or one of these metals may be used for one of the bodies while another of the bodies may be composed of another metal; further the particles 5 may suitably be of iron, or may be of molybdenum or titanium; thus a bonded body may be completely of one metal as titanium. It is to be understood that the invention is not limited to these metals; however titanium and molybdenum are preferred for high temperature work because of their own characteristics including their adhesion to the plated bonding agents, particularly nickel.

Figure 4:
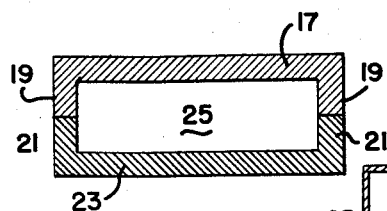
Figure 4 illustrates an arrangement of two metallic parts which are to be bonded in accordance with the invention.
Figure 5:
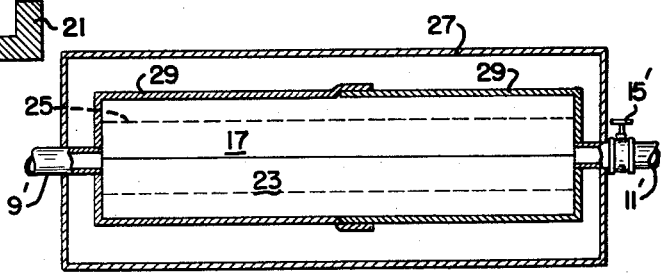
Figure 5 illustrates the arrangement for the bonding of the parts shown in Figure 4.

There is shown in Figures 4 and 5 a modified arrangement of the geometry of the metal bodies, in which an upper body 17 is provided with depending portions 19 which engage the upstanding portion 21 of body 23. Thus there is defined between the bodies a spacing 25 and to fill the same the bodies may, as indicated in Figure 5, be placed in an oven 27 and supplied with a plating gas, as described hereinbefore, through valves 15' and conduits 11', conduits 9' being connected to vacuum.

For this purpose the metal housing 29 which is provided with the plurality of conduits may be of slightly different shape than that described in connection with Figures 1-3, inclusive, but the same principles apply and the housing portions 29 fit snugly over the bodies 17, 23 and are so closely engaged therewith under the temperature conditions of the oven that no gas coats the metal bodies other than in the spacing 25 which is substantially completely filled with the thermally deposited metal.

Figure 6:
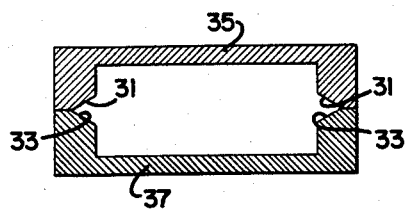
Figures 6 and 7 are views similar to that of Figure 4 illustrating a further embodiment of the inventive concept.

The structure of Figure 6 is preferable to that of Figure 4 as when subjected to plating the adjacent tapered portions 31, 33 of the bodies 35, 37 are also filled with plating gas and the tapered body of plated metal provides a more firm bond than the sharply defined configuration of the structure of Figure 4.

Figure 7:
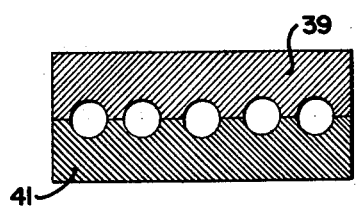

Figure 7 illustrates a further embodiment in which longitudinally extending grooves of the bodies 39, 41 are positioned in opposed relation to define arcuate spacings which when filled with metal as described in connection with the process of Figure 5 are securely adhered together.

The extent or depth of the spacing between the bodies to be bonded is not critical and very small deposits of a thickness approaching 0.00003 inch are attainable.

The plating time will vary with the nature of the piece and the rate of feed of the metal bearing gaseous component; generally it is desirable to provide an inlet and outlet for the gas at each spacing if the spacings are enclosed along the length thereof as in the structure of Figure 7.

For the purposes of the invention the plating procedures such as temperatures, pressures and flow rates may be those normally utilized. Preferably the pressures in the chamber are low, about 1 mm. of mercury usually being satisfactory; the flow rates are suitably between 1 to 10 liters per minute for the flow of metal bearing gas alone and are somewhat higher when a carrier gas such as $CO_2$, $H_2$ or $N_2$ is employed mixed with the plating gas. The temperature range is of more importance for suitable plating and the limits indicated in the following table are recommended:

| Plating Material | System Pressures, mm. of Hg | Temperature Range of Base Material in Degrees F. |
|---|---|---|
| $Ni(CO)_4$ | 0.5-1.0 | 350-450 |
| $Cr(CO)_6$ | 0.5-1.8 | 375-450 |
| $Mo(CO)_6$ | 0.5-1.8 | 450-650 |
| $W(CO)_6$ | 0.5-1.8 | 525-775 |

The product is one which is heat-bonded, that is, the metal is deposited and adhered both to itself and the bonding metals under relatively high temperature conditions, which contributes to the ability of the product to function under conditions of high heat in the neighborhood of 1500-1800° F. without developing undue deleterious stresses. Thus chromium, for example, will withstand without deteriortion 168 hours, in an oven having an oxidizing atmosphere, at a temperature of 1550° F.

It is further to be noted that mixtures of plating gases may be employed to produce the metallic bond. Thus deposits of nickel-chromium having the chromium alpha structure which leads to good ductility in a bond have been attained. In such instance the plating temperature for the mixture is in the range where the decomposition temperatures of each overlap—that is about 390-400° F. for nickel-chromium.

In this latter connection a most useful bond for MIC stainless steels is constituted of iron and nickel deposited from mixed gases of iron and nickel carbonyls with or without a carrier gas. The relative proportions of iron and nickel are regulated by the respective concentrations of the gases and these are selected to produce a bond which closely matches the bulk properties of the stainless steel undergoing bonding.

Thus iron and nickel carbonyls in the ratio of 1:2 by volume and at a system temperature of about 425-450° F. may be substituted for the nickel carbonyl itself as described hereinbefore; the system pressure in this case may preferably be between about 0.5-1 mm. of mercury.

It is to be noted that while other gases than the carbonyls are operative it is preferable to utilize the carbonyls for, as in the use of other metal bearing gaseous constituents, such as the cyclopentadienyls and the acetyl acetonates, the decomposition temperature is high and the compounds are prone to deposit powdery oxides which do not adhere as well to the metallic bodies as do the metals from the carbonyls.

The invention has particular utility in the bonding of metals which are subjected to high stress, high temperature and low pressures—as in aircraft designed to fly at high speeds in the upper atmosphere.

It will be understood that this invention is susceptible to modification in order to adopt it to different usages and conditions and accordingly, it is desired to comprehend such modifications within this invention as may fall within the scope of the appended claims.

We claim:

1. A method of bonding metal bodies together which comprises positioning the metal bodies in adjacent fixed relationship with an arcuate-shaped intervening spacing therebetween, fitting metal sheathing over the bodies in snug contact therewith, providing at least two openings in the sheathing to the spacing, evacuating the spacing, placing the sheathed bodies in an oven, heating the oven and the bodies to expand the bodies against the sheathing, flowing vapors of a mixture of heat-decomposable metal bearing compounds into the spacing to deposit a mixture of metals therein to fill the same and interlock the metal bodies with a ductile metal while continuing to evacuate the spacing, and removing the sheathing from the metal bonded bodies to form an integrally metal bonded article.

2. A method of bonding metal bodies together as set out in claim 1, wherein the heat-decomposable metal bearing compounds are nickel carbonyl and chromium carbonyl and said heating is carried out at a temperature of 390 to 400° F. to cause thermal decomposition of said carbonyl and deposition of nickel and chromium metal to provide a ductile metal bond.

(References on following page)

References Cited in the file of this patent

UNITED STATES PATENTS

| | | | |
|---|---|---|---|
| 827,378 | Lewis | July 31, | 1906 |
| 1,940,850 | Derby | Dec. 26, | 1933 |
| 2,130,879 | Dobke | Sept. 20, | 1938 |
| 2,366,905 | Heimberger | Jan. 9, | 1945 |
| 2,451,099 | La Motte | Oct. 12, | 1948 |
| 2,475,601 | Fink | July 12, | 1949 |
| 2,483,230 | Parsons | Sept. 27, | 1949 |
| 2,506,327 | Harrington | May 2, | 1950 |
| 2,512,455 | Alexander | June 20, | 1950 |
| 2,615,236 | Stulen | Oct. 28, | 1952 |
| 2,619,433 | Davis | Nov. 25, | 1952 |
| 2,638,423 | Davis | May 12, | 1953 |
| 2,657,457 | Toulmin | Nov. 3, | 1953 |
| 2,771,666 | Campbell | Nov. 27, | 1956 |